(12) United States Patent
Legatt et al.

(10) Patent No.: US 9,192,275 B2
(45) Date of Patent: Nov. 24, 2015

(54) FLOW AND SCRUBBING PRESSURE CONTROL SYSTEM AND METHODS FOR SURFACE TREATING APPARATUS

(75) Inventors: Donald J. Legatt, St. Michael, MN (US); Nicholas J. Graupe, White Bear Lake, MN (US)

(73) Assignee: Nilfisk-Advance, Inc., Plymouth, MN (US)

( * ) Notice: Subject to any disclaimer, the term of this patent is extended or adjusted under 35 U.S.C. 154(b) by 889 days.

(21) Appl. No.: 13/260,541

(22) PCT Filed: Mar. 26, 2009

(86) PCT No.: PCT/US2009/038396
§ 371 (c)(1),
(2), (4) Date: Oct. 24, 2011

(87) PCT Pub. No.: WO2010/110796
PCT Pub. Date: Sep. 30, 2010

(65) Prior Publication Data
US 2012/0041605 A1  Feb. 16, 2012

(51) Int. Cl.
*G05D 7/00* (2006.01)
*A47L 11/283* (2006.01)
*A47L 11/40* (2006.01)
*G01F 1/00* (2006.01)
*G01F 1/34* (2006.01)
*G01F 23/18* (2006.01)
*G05D 11/13* (2006.01)

(52) U.S. Cl.
CPC .............. *A47L 11/283* (2013.01); *A47L 11/40* (2013.01); *G01F 1/007* (2013.01); *G01F 1/34* (2013.01); *G01F 23/18* (2013.01); *G05D 11/132* (2013.01)

(58) Field of Classification Search
CPC ......... A47L 11/03; A47L 11/30; A47L 11/40; A47L 11/283; G01F 1/007; G01F 1/34; G01F 23/18; G05D 11/132
USPC ........... 700/245, 282, 283; 15/3, 4, 50.1, 319, 15/320
See application file for complete search history.

(56) References Cited

U.S. PATENT DOCUMENTS

| 4,667,364 | A | | 5/1987 | Meili | |
|---|---|---|---|---|---|
| 4,674,142 | A | * | 6/1987 | Meili | ............................. 15/49.1 |
| 5,288,333 | A | * | 2/1994 | Tanaka et al. | .................... 134/31 |
| 5,673,450 | A | * | 10/1997 | Briscoe | .......................... 15/49.1 |
| 5,922,968 | A | * | 7/1999 | Briscoe | ........................... 73/818 |
| 6,000,084 | A | * | 12/1999 | Briscoe | .......................... 15/49.1 |

(Continued)

*Primary Examiner* — Charles Kasenge
(74) *Attorney, Agent, or Firm* — Alan D. Kamrath; Kamrath IP Lawfirm, P.A.

(57) ABSTRACT

A surface treating apparatus (10) includes a tank (100) containing a cleaning solution (102) supplied to a supply point (SP) via a fluid flow line (106) under control of a flow control module (108). A chemical pump (144) controls flow of a chemical supplied to the fluid flow line (106). A controller (130) controls the flow control module (108) to operate at an operating flow rate based on a level of the cleaning solution (102) sensed by a solution sensor (120). The controller (130) controls the chemical pump (144) to operate at a flow rate based on the operating flow rate so that the chemical is supplied to the supply point (SP) at a selected chemical dilution ratio. An agitating element (105) agitates the surface with scrubbing pressure which is adjusted by the controller (130). A spike button (168) is coupled to controller (130) and operable to momentarily increase the flow rate, chemical dilution ratio, and/or scrubbing pressure to remove unusually dirty spots.

33 Claims, 3 Drawing Sheets

(56) References Cited

U.S. PATENT DOCUMENTS

| | | | |
|---|---|---|---|
| 6,105,192 A | 8/2000 | Deiterman et al. | |
| 6,301,738 B1 | 10/2001 | Deiterman et al. | |
| 6,493,896 B1* | 12/2002 | Stuchlik et al. | 15/49.1 |
| 7,406,739 B2* | 8/2008 | Guest et al. | 15/49.1 |
| 7,827,645 B2* | 11/2010 | Eklund et al. | 15/50.1 |
| 2004/0200017 A1* | 10/2004 | Crane et al. | 15/49.1 |
| 2005/0199274 A1* | 9/2005 | Abbott | 134/56 R |
| 2007/0016328 A1* | 1/2007 | Ziegler et al. | 700/245 |
| 2007/0192973 A1* | 8/2007 | Eklund et al. | 15/50.1 |
| 2007/0205112 A1* | 9/2007 | Kodera et al. | 205/641 |
| 2007/0254558 A1* | 11/2007 | Kodera et al. | 451/28 |
| 2008/0127445 A1* | 6/2008 | Konandreas et al. | 15/319 |
| 2008/0127446 A1* | 6/2008 | Ziegler et al. | 15/320 |
| 2008/0134457 A1* | 6/2008 | Morse et al. | 15/319 |
| 2008/0134458 A1* | 6/2008 | Ziegler et al. | 15/320 |
| 2008/0140255 A1* | 6/2008 | Ziegler et al. | 700/245 |
| 2008/0155768 A1* | 7/2008 | Ziegler et al. | 15/4 |

\* cited by examiner

FLOW AND SCRUBBING PRESSURE CONTROL SYSTEM AND METHODS FOR SURFACE TREATING APPARATUS

BACKGROUND OF THE INVENTION

The present invention relates to methods and apparatus for controlling operating parameters of a surface treating apparatus and specifically providing accurate adjustment of flow rates, chemical dilution ratios and/or scrubbing pressure.

Surface cleaning or treating apparatuses have been widely used and generally include a solution tank for storing and dispensing a cleaning solution, a scrub deck having one or more agitating elements such as in the form of brushes or pads for scrubbing a surface such as a floor with the cleaning solution, a tool such as a squeegee for collecting dirty solution, and a recovery tank for recovering the dirty solution from the floor through a hose. Most often, the cleaning solution is a mixture of a cleaning chemical and clean tap water. Traditionally, the chemical was simply added into the solution tank, and the entire tank became a mixture of clean water and chemical. The dilution ratio of the water/chemical mixture could not be exactly controlled, for it depended on the person pouring the chemical into the solution tank.

In recent years, chemical injection has become a common feature for surface treating apparatuses. Typical chemical injection systems include a separate cleaning chemical storage container mounted on the surface treating apparatus. A mechanism is utilized to dispense a controlled amount of chemical into the clean water, at or near the point of use. These chemical injection systems are more accurate in chemical metering. In order to be able to control the chemical dilution ratio, both the clean water and chemical flow rates must be controllable. The flow rate of the cleaning solution can be controlled by different ways including: gravity feed without adjustment, which is least accurate; gravity feed with a manually adjusted ball valve; gravity feed in conjunction with an electronically pulsed solenoid valve; and feed with a pump.

U.S. Pat. Nos. 6,105,192 and 6,301,738 disclose a solenoid valve and timing module kit for use with a floor treating apparatus using gravity feed in conjunction with the solenoid valve pulsed electronically. The timing module continuously opens and closes the solenoid valve in response to operator control. The introduction of surface treating apparatuses represented by U.S. Pat. Nos. 6,105,192 and 6,301,738 obtained significant advantages in the marketplace in eliminating conventional ball or needle valves that are always open when the cleaning solution is supplied, in creating anything from a trickle to a full flow of the cleaning solution, in allowing an operator to generally maintain flow of the cleaning solution, and in minimizing any lag time in starting or stopping the supply of the cleaning solution to a floor treating device by locating the solenoid valve immediately above the supply points. However, even such an innovative and commercially successful apparatus has need for further improvement. In particular, in gravity feed systems including the type represented by U.S. Pat. Nos. 6,105,192 and 6,301,738 as well as other types, the level of the cleaning solution or water in the solution tank drops due to dispensation of the cleaning solution or water and, thus, affects the maximum flow rate of the solenoid valve, leading to a decrease in the flow rate of the cleaning solution and to an increase in the chemical dilution ratio, both of which are undesired. The operator control for maintaining the constant flow of the cleaning solution is not always accurate. Furthermore, currently available surface treating apparatuses do not allow accurate adjustment of the scrubbing pressure during operation.

Thus, a need exists for methods and apparatus providing accurate adjustment of a flow rate of cleaning solution, a chemical dilution ratio and/or scrubbing pressure in surface treating apparatuses.

BRIEF SUMMARY OF THE INVENTION

The present invention solves this need and other problems in the field of surface treating by providing, in a preferred form, a surface treating apparatus and its methods of adjustment. In a preferred aspect, the surface treating apparatus includes a tank containing a cleaning solution. A fluid flow line is in communication with the tank and supplies the cleaning solution from the tank to a supply point, with the cleaning solution being agitated by an agitating element on a surface. A flow control module in the most preferred form of a solenoid valve is in line with the fluid flow line. The flow control module permits flow of the cleaning solution from the tank to the fluid flow line when the flow control module is open. The flow control module is operable to control a flow rate and an amount of the cleaning solution from the tank to the fluid flow line. The flow control module inhibits flow of the cleaning solution from the tank through the fluid flow line to the supply point when the flow control module is closed. A solution sensor senses a level of the cleaning solution in the tank. A controller is coupled to the solution sensor and the flow control module. The controller controls the flow control module to operate at an operating flow rate based on the level of the cleaning solution in the tank.

In the most preferred form, the solution sensor is a differential pressure sensor sensing a static pressure head of the cleaning solution in the tank, and the controller determines the level of the cleaning solution in the tank based on the static pressure head sensed. Furthermore, the controller calculates a maximum flow rate of the solenoid valve based on the static pressure head sensed. The controller controls the solenoid valve to operate at a duty cycle based on the maximum flow rate of the solenoid valve and a selected flow rate of the cleaning solution. A flow rate adjuster is coupled to the controller and manually operable to adjust the selected flow rate of the cleaning solution. The controller controls the flow control module to operate in response to the flow rate adjuster.

In further aspects, a chemical pump is in line with a chemical flow line in communication with the fluid flow line and a chemical storage container and is operable to control a flow rate of the chemical from the chemical storage container to the fluid flow line. The chemical mixes with the cleaning solution to form a cleaning compound. The controller controls the chemical pump to operate at a flow rate based on the operating flow rate so that the cleaning compound is supplied to the supply point at a selected chemical dilution ratio. A display is coupled to the controller and displays the selected chemical dilution ratio and the level of the cleaning solution in the tank.

In still further aspects, the agitating element, moved in the most preferred form by a motor, agitates the surface with a scrubbing pressure. Furthermore, a scrubbing pressure sensor is coupled to the controller and senses a condition, in a preferred approach by sensing an amperage of the motor moving the agitating element, indicative of the scrubbing pressure of the agitating element agitating the surface and sends a signal indicative of the scrubbing pressure to the controller. A scrubbing pressure adjuster is coupled to the controller and is manually operable to select a magnitude of the scrubbing pressure. The controller is operable to control the scrubbing pressure of the agitating element agitating the surface indicated by the condition sensed by the scrubbing pressure sensor to be equal to the selected magnitude of the scrubbing pressure.

In still further aspects, a spike button is coupled to the controller and can be pushed to momentarily increase at least one of the flow rate, the chemical dilution ratio, and the scrubbing pressure so that the surface treating apparatus can operate at least one of the increased flow rate, the increased chemical dilution ration, and the increased scrubbing pressure to clean an unusually dirty spot on the surface. The surface treating apparatus resumes normal operation after the momentary increase in at least one of the flow rate, the chemical dilution ratio, and the scrubbing pressure.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
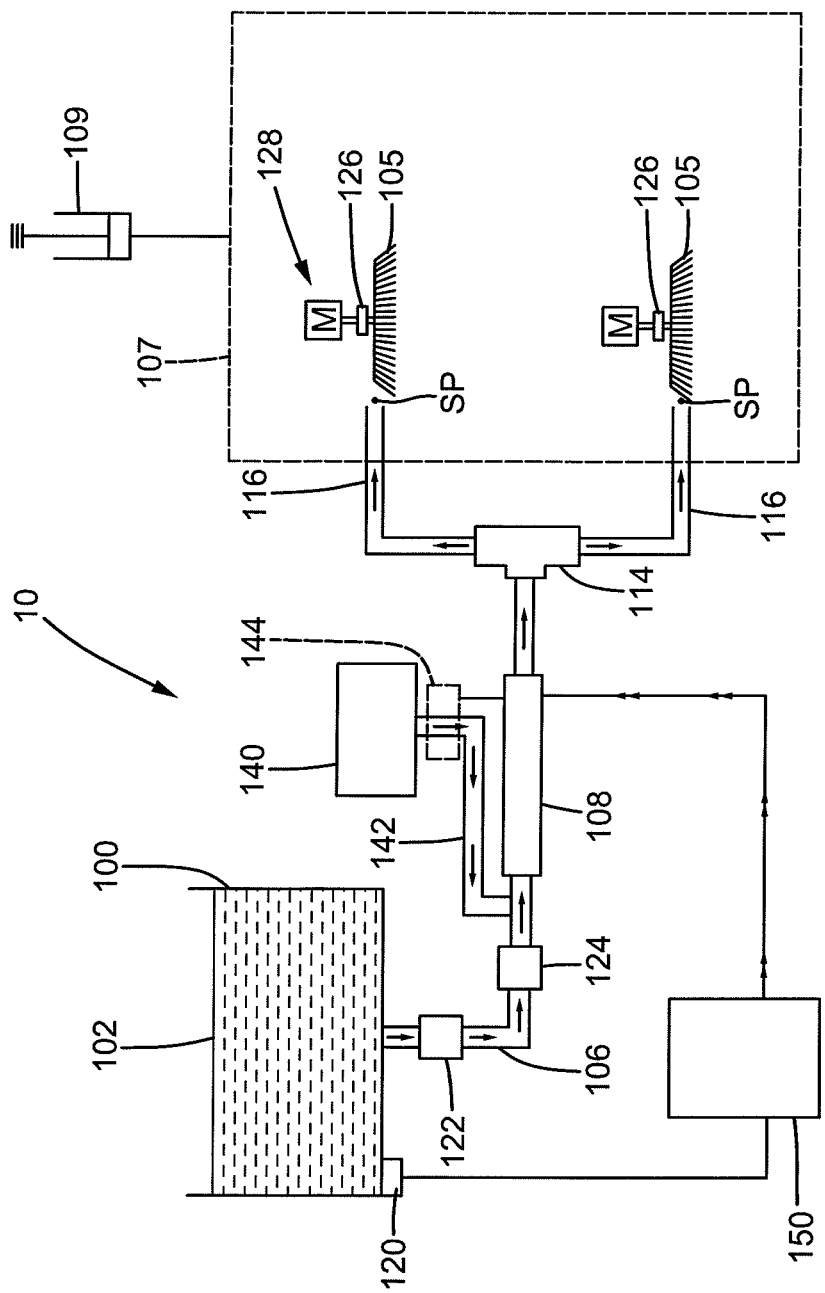
FIG. 1 shows a diagrammatic view of a surface treating apparatus according to the preferred teachings of the present invention.
Figure 2:
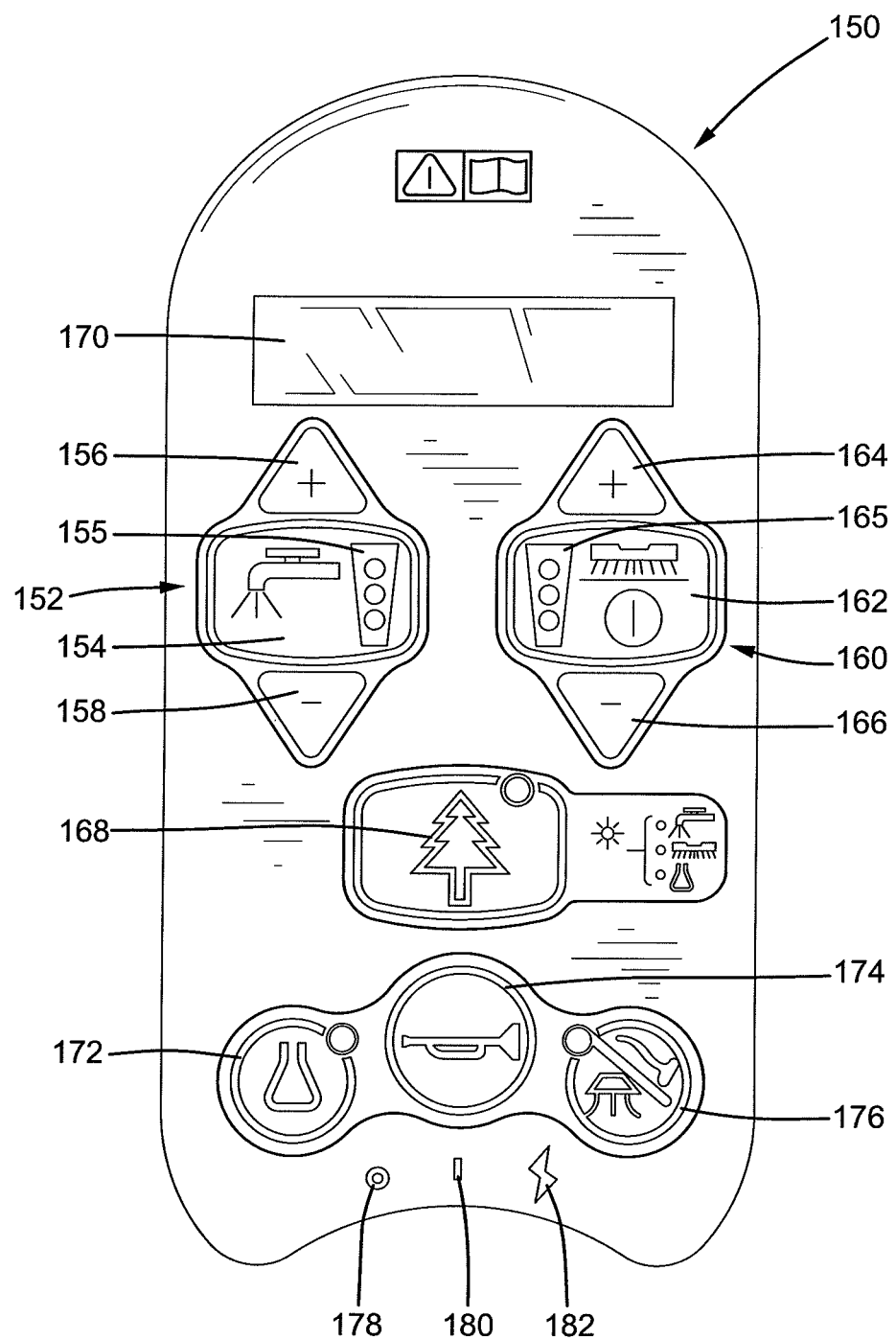
FIG. 2 shows a top view of a control board of the surface treating apparatus of FIG. 1.
Figure 3:
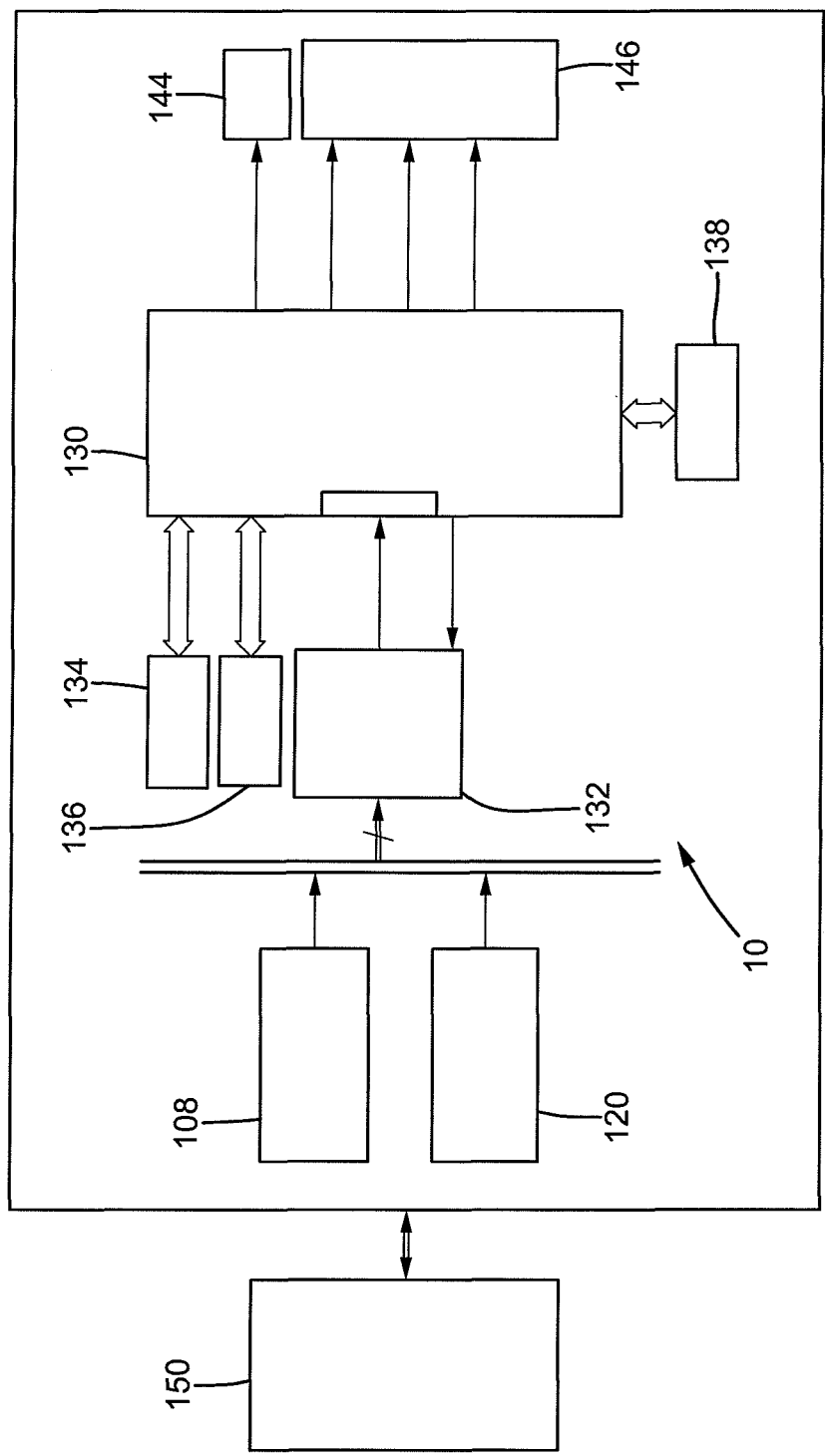
FIG. 3 shows a block diagram of electrical components of the surface treating apparatus of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "surface", "floor", "level", "downstream", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A surface treating apparatus according to the preferred teachings of the present invention is shown in the drawings and generally designated 10. Surface treating apparatus 10 is shown in its most preferred form for treating floor surfaces. Surface treating apparatus 10 includes two agitating elements 105 shown in the most preferred form as disc type brushes for agitating a surface. However, agitating elements 105 can have other forms such as cylindrical brushes, pads, or the like. Surface treating apparatus 10 further includes a suitable drive 128, shown in the preferred form as motors M, for moving agitating elements 105, such as rotating in a single direction, to agitate the surface with a scrubbing pressure. Motors M can be operated independently or jointly according to needs. Furthermore, surface treating apparatus 10 can include only a single agitating element 105 or more than two agitating elements 105 and a corresponding number of motors M. However, drive 128 can include a single motor M to move two or more agitating elements 105. Drive 128 can be of other forms and types according to the preferred teachings of the present invention.

Surface treating apparatus 10 further includes a scrub deck 107 to support and carry agitating elements 105 and drive 128. Scrub deck 107 can include a mechanism 109, diagrammatically shown in the preferred form as a hydraulic device, to raise and lower agitating elements 105 for engaging and treating the surface. A scrubbing pressure sensor 126 is coupled to scrub deck 107, to one or both of agitating elements 105, to drive 128, and/or the like for sensing a condition indicative of the scrubbing pressure of agitating element 105 agitating the surface and sending a signal indicative of the scrubbing pressure sensed. In the most preferred form shown, scrubbing pressure sensors 126 sense amperages of motors M driving agitating elements 105. The greater the amperage of each motor M required for moving each agitating element 105 on the surface, the greater the scrubbing pressure the agitating element 105 scrubbing the surface to be treated. However, the condition indicative of the scrubbing pressure of agitating elements 105 agitating the surface is not limited to the amperage of each motor M. Other suitable conditions for indicating the scrubbing pressure of agitating elements 105 agitating the surface include, but are not limited to, sensing direct pressure of agitating elements 105 agitating the surface, expansion of springs or the like of mechanism 109 mounted between agitating elements 105 and scrub deck 107, or anything that shows movement of scrub deck 107 and/or agitating elements 105.

In the preferred form shown, surface treating apparatus 10 further includes a tank 100 containing a cleaning solution 102 such as water or a mixture of water and other ingredients which could be utilized in treating the surface. In the most preferred form shown, tank 100 has a geometry having regular cross sections such as circular, rectangular, or square cross sections so that the total amount of cleaning solution 102 can be easily calculated based on the cross sectional area of tank 100 and a level of cleaning solution 102 in tank 100 that can be sensed or determined according to the teachings of the present invention, which will be described later. Cleaning solution 102 is delivered by a fluid flow line 106 from tank 100 to one or more supply points SP so that agitating elements 105 agitate cleaning solution 102 with the surface. A flow control module 108 is mounted in line with fluid flow line 106 and is operable to control flow of cleaning solution 102 from tank 100 to fluid flow line 106. Specifically, when flow control module 108 is open, flow control module 108 is operable to control a flow rate and an amount of cleaning solution 102 from tank 100 to fluid flow line 106. On the other hand, when flow control module 108 is closed, flow control module 108 inhibits flow of cleaning solution 102 from tank 100 through fluid flow line 106 to supply points SP. In the most preferred form shown, flow control module 108 is a solenoid valve such as a Deltrol Controls solenoid valve, part number DSVP11-7PX-8SR-6L5 or DSVPII-1PX-8SL-645 or part number 70163-60. However, solenoid valves of other types, valves other than solenoid valves and other types of flow controls utilizing gravity feed can be utilized as flow control module 108 according to the teachings of the present invention.

In the most preferred form shown, a check valve 122 is mounted to fluid flow line 106 between tank 100 and flow control module 108 to prevent flow of cleaning solution 102 back into tank 100. Furthermore, a filter 124 is mounted on fluid flow line 106 between check valve 122 and flow control module 108 to filter impurities from cleaning solution 102.

In the most preferred form shown, surface treating apparatus 10 further includes a chemical storage container 140 containing a chemical. A chemical flow line 142 is interconnected between and in communication with chemical storage container 140 and fluid flow line 106. A chemical pump 144 is mounted in line with chemical flow line 142 and is operable to control a flow rate of the chemical from chemical storage container 140 to fluid flow line 106. In the most preferred form shown, chemical flow line 142 intersects with fluid flow line 106 intermediate flow control module 108 and tank 100, so that the chemical mixes with cleaning solution 102 to form a cleaning compound before entering flow control module 108. Chemical pump 144 can be a solenoid driven pump including a plunger that draws in the chemical from chemical storage container 140 when the solenoid is driven one way. The chemical is pushed out into fluid flow line 106 when the solenoid is driven with opposite polarity. However, other types and forms of chemical metering pumps can be utilized according to the teachings of the present invention.

In the most preferred form shown, a splitter 114 splits fluid flow line 106 into two fluid delivery lines 116 each delivering the cleaning compound to be agitated on the surface by one of agitating elements 105. Flow control module 108 is immediately above splitter 114 to minimize any lag time in starting or stopping supply of the cleaning compound to the surface to be treated. Splitter 114 can split fluid flow line 106 into more than two fluid delivery lines 116 such as when more than two agitating elements 105 are utilized. However, surface treating apparatus 10 does not have to include splitter 114 to split fluid flow line 106 such as when only one agitating element 105 is utilized.

Surface treating apparatus 10 further includes a frame to support the components including tank 100, scrub deck 107, chemical storage container 140, and fluid flow line 106. Surface treating apparatus 10 further includes suitable provisions for movably supporting the frame upon the surface to be treated such as by casters or wheels attached to the frame which can also be driven by an electric motor or any suitable power source. Surface treating apparatus 10 can further include a tool such as a squeegee behind scrub deck 107 for collecting dirty solution as well as a recovery tank for receiving the dirty solution collected by the tool through a hose.

According to the preferred teachings of the present invention, surface treating apparatus 10 includes a solution sensor 120 sensing the level of cleaning solution 102 in tank 100 shown in the most preferred form as a differential pressure sensor mounted in a bottom of tank 100 to measure a static pressure head of cleaning solution 102 in tank 100. Solution sensor 120 produces an analog voltage between 0 and 5 volts that is linearly proportional to the level of cleaning solution 102 in tank 100. However, solution sensors 120 can be of other forms and types which can be mounted at other locations relative to tank 100 to measure the level of cleaning solution 102 in tank 100. As an example, solution sensor 120 could be mounted adjacent to the top of tank 100 and extend therein. Likewise, solution sensor 120 could include a float for sensing the level of cleaning solution 102 in tank 100 and a signal generator coupled to the float for sending a signal indicative of the level via a wire or wireless transmission.

According to the teachings of the present invention, surface treating apparatus 10 further includes a controller 130 in the most preferred form shown as a microcontroller coupled to solution sensor 120, flow control module 108, and chemical pump 144. Controller 130 receives the analog voltage from solution sensor 120 via an analog multiplexer 132. Controller 130 includes software that uses the analog voltage from solution sensor 120 to determine the level of cleaning solution 102 in tank 100. Controller 130 calculates a maximum flow rate of flow control module 108 based on the level of cleaning solution 102 in tank 100. Since the geometry of tank 100 and the level of cleaning solution 102 in tank 100 are known in the most preferred form of the present invention, the total amount of cleaning solution 102 in tank 100 can be easily calculated by the software included in controller 130.

In the most preferred form shown, controller 130 is also coupled to a universal asynchronous receiver/transmitter (UART) 134, a joint test action group (JTAG) interface 136, an electronically erasable programmable read-only memory (EEPROM) 138, and an output connection 146 to which fluid control module 108 is coupled. EEPROM 138 stores the software and any necessary data such as the geometry of tank 100, a plurality of chemical dilution ratio settings, a plurality of amperage settings, and a plurality of flow rate settings. The chemical dilution ratio settings stored in EEPROM 138 for a surface treating apparatus in the preferred form of a riding floor scrubber are 1:32, 1:50, 1:64, 1:100, 1:128, 1:150, 1:200, 1:256, 1:300, and 1:400. The amperage settings stored in EEPROM 138 are 27 amperes, 32 amperes, and 40 amperes. Motors M can operate at one of the amperage settings corresponding to a selected scrubbing pressure. The flow rate settings stored in EEPROM 138 are 0.3 GPM (gallon per minute), 0.6 GPM, and 0.9 GPM. Flow control module 108 can operate at one of the flow rate settings. However, other settings and/or infinitely variable settings can be utilized according to the teachings of the present invention.

According to the preferred form shown, surface treating apparatus 10 further includes a control board 150 having a flow rate adjuster 152 coupled to controller 130 and a display 170 coupled to controller 130 and in the most preferred form shown as a liquid crystal display. Flow rate adjuster 152 allows an operator to select the flow rate of cleaning solution 102 to the surface to be treated. In the preferred form shown, flow rate adjuster 152 includes a flow adjustment on/off button 154, a flow increase button 156, a flow decrease button 158, and a plurality of indicator lamps 155 representing the flow rate settings stored in EEPROM 138. Flow rate adjuster 152 allows the operator to select a desired flow rate of cleaning solution 102 from one of the flow rate settings. When flow adjustment on/off button 154 is turned on, the operator can adjust the desired flow rate of cleaning solution 102 by operating flow increase button 156 or flow decrease button 158. In the most preferred form shown, the first flow rate setting (e.g., 0.3 GPM) is entered and indicated by one of indicator lamps 155 when the operator pushes flow rate increase button 156 once. The second flow rate setting (e.g., 0.6 GPM) is entered and indicated by another indicator lamp 155 when flow increase button 156 is pushed again, and so on. Likewise, the operator can decrease the selected flow rate setting by pushing flow rate decrease button 158. Note that the selected flow rate of cleaning solution 102 can be indicated by one or more of indicator lamps 155. Adjustment of the flow rate of cleaning solution 102 is not allowed when flow adjustment on/off button 154 is turned off. It should be appreciated that flow rate adjuster 152 can be of other forms and types for adjusting the flow rate of cleaning solution 102 according to the teachings of the present invention. As an example, although flow rate adjuster 152 in the preferred form shown includes flow rate increase button 156 and flow rate decrease button 158 to select the flow rate setting, flow rate adjuster 152 can include only one flow rate select button to select the flow rate settings that change from one to another in a circulating sequence by repeatedly pushing the flow rate select button.

Control board 150 further includes a chemical dilution ratio select button 172 adjusting the dilution ratio of the chemical introduced into cleaning solution 102. In the most preferred form shown, the first chemical dilution ratio setting (e.g., 1:32) is entered and shown on display 170 when the operator pushes chemical dilution ratio select button 172 once. The second chemical dilution ratio setting (e.g., 1:50) is entered and shown on display 170 when chemical dilution ratio select button 172 is pushed again, and so on. When chemical dilution ratio select button 172 is pushed while the last chemical dilution ration setting (e.g., 1:400) is shown on display 170, the first chemical dilution ratio setting (e.g., 1:32) is entered and shown on display 170. Thus, a desired chemical dilution ratio can be selected by pushing chemical dilution ratio select button 172. It should be appreciated that other provisions for setting the desired dilution ratio can be utilized according to the teachings of the present invention.

The level of cleaning solution 102 in tank 100 is also shown on display 170. Control board 150 can also include a timing module to control opening and closing periods of time of fluid control module 108. An example of the time module is disclosed in U.S. Pat. Nos. 6,105,192 and 6,301,738, the entire contents of which are incorporated herein by reference.

In the most preferred form shown, controller 130 is also coupled to scrubbing pressure sensors 126 and receives signals from scrubbing pressure sensors 126 indicative of the scrubbing pressure indicated by the condition sensed. Control board 150 further includes a scrubbing pressure adjuster 160 coupled to controller 130 for selecting the scrubbing pressure of agitating elements 105 upon the surface. According to the preferred embodiment shown, scrubbing pressure adjuster 160 includes a scrubbing pressure adjustment on/off button 162, a scrubbing pressure increase button 164, a scrubbing pressure decrease button 166, and a plurality of indicator lamps 165 representing the scrubbing pressure settings indicated by the amperage of motors M moving agitating element 105 to agitate the surface in the most preferred form shown. When scrubbing pressure adjustment on/off button 162 is turned on, the operator can adjust the desired scrubbing pressure by operating scrubbing pressure increase button 164 or scrubbing pressure decrease button 166 to select a desired magnitude. The selected magnitude of the scrubbing pressure is indicated by one or more of indicator lamps 165. Adjustment of the scrubbing pressure is not allowed when scrubbing pressure adjustment on/off button 162 is turned off. Once the scrubbing pressure is set by pushing scrubbing pressure increase button 164 or scrubbing pressure decrease button 166, surface treating apparatus 10 raises and lowers scrub deck 107 so that motors M stay within a desired amperage range in the preferred form between 27-40 amperes. It should be appreciated that scrubbing pressure adjuster 160 can be of other forms and types for adjusting the scrubbing pressure according to the teachings of the present invention. As an example, although scrubbing pressure adjuster 160 in the preferred form shown includes scrubbing pressure increase button 164 and scrubbing pressure decrease button 166 to select the scrubbing pressure setting, scrubbing pressure adjuster 160 can include only one scrubbing pressure select button to select the flow rate settings that change from one to another in a circulating sequence by repeatedly pushing the scrubbing pressure select button.

In the most preferred form shown, control board 150 further includes a spike button 168. During normal operation of surface treating apparatus 10 at a selected flow rate, a selected dilution ratio, and a selected scrubbing pressure, the operator can push spike button 168 for momentarily increasing at least one of the selected flow rate of cleaning solution 102, the selected chemical dilution ratio of the cleaning compound, and the scrubbing pressure of the agitating elements 105 agitating the surface for a period of time so that surface treating apparatus 10 operates at the increased flow rate of cleaning solution 102, the increased chemical dilution ratio of the cleaning compound, and the increased scrubbing pressure of agitating elements 105 agitating the surface for the period of time when the operator sees an unusually dirty spot on the surface. However, surface treating apparatus 10 resumes operation at the selected flow rate of cleaning solution 102, the selected chemical dilution ratio of the cleaning compound, and the selected scrubbing pressure of agitating elements 105 agitating the surface after the period of time passes. Specifically, when spike button 168 is pushed, controller 130 increases the flow rate of cleaning solution 102 from the selected flow rate setting (e.g., 0.3 GPM) to a larger flow rate setting such as the next setting (e.g., 0.6 GPM) for the period of time, increases the chemical dilution ratio from the selected chemical dilution ratio setting (e.g., 1:50) to a larger chemical dilution ratio setting such as the next setting (e.g., 1:32) for the period of time, and/or increases the scrubbing pressure of agitating elements 105 agitating the surface from the selected scrubbing pressure setting (e.g., 27 amperes) to a larger scrubbing pressure setting such as the next setting (e.g., 32 amperes) for the period of time. However, the flow rate, the chemical dilution ratio, and the scrubbing pressure can be increased two or more settings when spike button 168 is pushed. However, the flow rate of cleaning button 102 is neither increased nor decreased when the selected flow rate setting is the highest one of the flow rate settings even though spike button 168 is pushed. Likewise, the chemical dilution ratio setting of the cleaning compound is neither increased nor decreased when the selected chemical dilution ratio is the highest one of the chemical dilution ratio settings even though spike button 168 is pushed. Likewise, the scrubbing pressure of agitating elements 105 agitating the surface is neither increased nor decreased when the selected scrubbing pressure setting is the highest one of the scrubbing pressure settings even though spike button 168 is pushed. In another mode of operation, no chemical is being added into cleaning solution 102 during normal operation, and an amount of chemical is added from chemical storage container 140 into cleaning solution 102 in fluid flow line 106 when spike button 168 is pushed. The period of time of spiking could range from a couple of seconds to a couple of minutes or longer, such as 10 seconds to 2 minutes. However, any suitable range of period of time can be utilized for spiking to remove unusually dirty spots according to the teachings of the present invention.

In the most preferred form shown, control board 150 further includes a horn actuating button 174 for alarm purposes and a vacuum or wand actuating button 176 for performing collection of the dirty solution and debris or the like. Control board 150 further includes power on and off indicator lamps 178 and 180 for indicating on/off of a main power. Further, control board 150 includes a power shortage indicator lamp 182 for indicating shortage of power or battery.

Now that the basic construction of surface treating apparatus 10 of the preferred teachings of the present invention has been explained, operation and some of the advantages of surface treating apparatus 10 can be set forth and appreciated. Control board 150 becomes active when the main power of surface treating apparatus 10 is turned on. Solution sensor 120 senses the level of cleaning solution 102 in tank 100 and produces an analog voltage between 0 and 5 volts linearly proportional to the level of cleaning solution 102 in tank 100. The level of cleaning solution 102 in tank 100 is determined by controller 130 based on the analog voltage and is shown on display 170. Controller 130 calculates the maximum flow rate of flow control module 108 based on the level of cleaning solution 102 in tank 100. Controller 130 also calculates the total amount of cleaning solution 102 in tank 100 based on the level of cleaning solution 102 in tank 100 and the geometry of tank 100 so that the operator can know how full cleaning solution 102 in tank 100 is.

A flow rate of cleaning solution 102 to be delivered to supply points SP is selected through operation of flow rate adjuster 152, and a desired chemical dilution ratio is selected through operation of chemical dilution ratio select button 172. Controller 130 calculates an operating flow rate of flow control module 108 based on the level of cleaning solution 102 in tank 100. In the most preferred form shown, controller 130 calculates the duty cycle of flow control module 108 by dividing the selected flow rate of cleaning solution 102 by the maximum flow rate of flow control module 108 at the current level. Then, controller 130 sends a signal indicative of the duty cycle to flow control module 108 so that flow control module 108 operates at the operating flow rate based on the level of cleaning solution 102 in tank 100. Furthermore, controller 130 controls chemical pump 144 to operate at a flow rate based on the operating flow rate of flow control module 108 and the selected chemical dilution ratio to add a desired amount of chemical from chemical storage container 140 to fluid flow line 106 so that the cleaning compound is supplied to supply points SP at the selected chemical dilution ratio.

Since the level of cleaning solution 102 in tank 100 lowers after a period of time of use, the maximum flow rate of cleaning solution 102 from flow control module 108 to supply points SP will drop. The software compensates for this drop by adjusting the duty cycle of flow control module 108 depending on the current level of cleaning solution 102 in tank 100.

When the flow control system according to the teachings of the present invention is active, controller 130 transmits a square wave with a period of 6 seconds and the duty cycle of flow control module 108 obtained from dividing the desired flow rate by the maximum flow rate of flow control module 108. If the desired flow rate is greater than the maximum flow rate of flow control module 108, the duty cycle shall be 100%.

The flow rate of cleaning solution 102 and the chemical dilution ratio can be adjusted at any time according to needs. The selected flow rate of cleaning solution 102 is indicated by indicator lamps 155, whereas the selected chemical dilution ratio is shown on display 170. Due to provision of solution sensor 120 and controller 130, flow control module 108 immediately operates in response to the selected flow rate of cleaning solution 102, and chemical pump 144 operates in response to the selected chemical dilution ratio and based on the selected flow rate of cleaning solution 102. The solution supply system according to the preferred teachings of the present invention is more accurate than conventional gravity feed systems, because the level of cleaning solution 102 in tank 100 is sensed and utilized to control the flow rates of cleaning solution 102 and the chemical. It should be appreciated that chemical pump 144 does not have to be activated when the chemical is not required during treating of the surface.

When drive 128 is activated, agitating elements 105 are moved to agitate the cleaning compound delivered to each supply point SP with a scrubbing pressure. The condition indicative of the scrubbing pressure is sensed by scrubbing pressure sensors 126. The operator can select the magnitude of the scrubbing pressure through scrubbing pressure adjuster 160. The selected magnitude of the scrubbing pressure is compared with the scrubbing pressure sensed. Controller 130 controls at least one of mechanism 109, scrub deck 107, and agitating elements 105 until the scrubbing pressure of each agitating element 105 agitating the surface indicated by the condition sensed by each scrubbing pressure sensor 126 is equal to the selected magnitude of the scrubbing pressure. In the most preferred form shown, controller 130 controls mechanism 109 to move scrub deck 107 so that agitating elements 105 agitate the surface with motors M operating at one of the amperage settings corresponding to the selected scrubbing pressure. In another approach, agitating elements 105 can be moved toward or away from the surface relative to scrub deck 107 to increase or decrease the scrubbing pressure. However, other approaches for increasing or decreasing the scrubbing pressure would be within the skill of the art. Thus, surface treating apparatus 10 according to the preferred teachings of the present invention allows easy and more accurate adjustment of the scrubbing pressure.

Surface treating apparatus 10 normally operates at three parameters including the selected flow rate setting, the selected chemical dilution ratio setting, and the selected scrubbing pressure setting. However, when the operator sees an unusual dirty spot on the surface, the operator pushes spike button 168 so that controller 130 momentarily increases at least one of supply of cleaning solution 102, supply of the chemical from chemical storage container 140 to fluid flow line 106, and the scrubbing pressure of the agitating elements 105 agitating the surface for a preset period of time. After operation at the preset period of time, controller 130 resumes normal operation of surface treating apparatus 10 at the selected flow rate of cleaning solution 102, the selected chemical dilution ratio of the cleaning compound, and the selected scrubbing pressure of agitating elements 105 agitating the surface.

It can be appreciated that the operator can select the flow rate, chemical dilution, and scrubbing pressure for cleaning a surface in a normal condition, and spike button 168 can be pushed only when surface treating apparatus 10 according to the teachings of the present invention encounters unusually dirty spots. Thus, due to provision of spiking operation only required in removing unusually dirty spots, surface apparatus treating apparatus 10 according to the teachings of the present invention consumes a lesser amount of cleaning solution 102 compared to conventional surface treating apparatuses. The surface can dry faster due to use of a lesser amount of cleaning solution while cutting the costs for cleaning solution 102 by utilizing surface apparatus treating apparatus 10 according to the teachings of the present invention.

Likewise, due to provision of spiking operation only required in removing unusually dirty spots, surface apparatus treating apparatus 10 according to the teachings of the present invention consumes a lesser amount of chemical than compared to conventional surface treating apparatuses. The costs for chemical are also cut while providing environmentally friendly operation by utilizing surface apparatus treating apparatus 10 according to the teachings of the present invention.

Likewise, due to provision of spiking operation only required in removing unusually dirty spots, surface apparatus treating apparatus 10 according to the teachings of the present invention consumes lesser energy than conventional surface treating apparatuses. The need for generating energy is reduced due to consumption of less energy. Accordingly, the energy costs are also cut in while providing environmentally friendly operation by utilizing surface apparatus treating apparatus 10 according to the teachings of the present invention.

Now that the basic teachings of the present invention have been explained, many extensions and variations will be obvious to one having ordinary skill in the art. For example, although methods and apparatus for adjusting the flow rate, chemical dilution ratio, and scrubbing pressure have been utilized in a single surface treating apparatus and is believed to produce synergistic results, adjustment of only one of the flow rate, chemical dilution ratio, and scrubbing pressure could be provided in a surface treating apparatus according to the teachings of the present invention.

Similarly, according to the teachings of the present invention, chemical can be added from chemical storage container 140 to fluid flow line 106 downstream of flow control module 108 such as intermediate flow control module 108 and splitter 114. Furthermore, each fluid delivery line 116 can include a flow control module 108 when more than one fluid delivery line 116 is utilized.

Furthermore, instead of being indicated by indicator lamps 155, the selected flow rate of cleaning solution 102 can be directly shown by an indicator of other forms and types such as by digits on display 170 to provide more accurate adjustment in the flow rate. Likewise, instead of being indicated by indicator lamps 165, the selected magnitude of the scrubbing pressure of agitating elements 105 agitating the surface can be directly shown by an indicator of other forms and types such as by digits on display 170 to provide more accurate adjustment in the scrubbing pressure.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A surface treating apparatus comprising, in combination:
a tank containing a cleaning solution; a fluid flow line in communication with the tank and supplying the cleaning solution from the tank to a supply point; an agitating element adapted to agitate a surface, with the agitating element agitating the cleaning solution with the surface; a flow control module in line with the fluid flow line, with the flow control module permitting flow of the cleaning solution from the tank to the fluid flow line when the flow control module is open, with the flow control module being operable to control a flow rate and an amount of the cleaning solution from the tank to the fluid flow line, with the flow control module inhibiting flow of the cleaning solution from the tank through the fluid flow line to the supply point when the flow control module is closed; a solution sensor sensing a level of the cleaning solution in the tank; a controller coupled to the solution sensor and the flow control module, with the controller controlling the flow control module to operate at an operating flow rate based on the level of the cleaning solution in the tank; a chemical storage container containing a chemical; a chemical flow line in communication with the chemical storage container and the fluid flow line, with the chemical fluid line supplying the chemical from the chemical storage container to the fluid flow line, with the chemical mixing with the cleaning solution to form a cleaning compound, with the agitating element agitating the cleaning compound with the surface; a chemical pump in line with the chemical flow line, with the chemical pump coupled to the controller and being operable to control a flow rate of the chemical from the chemical storage container to the fluid flow line, with the controller controlling the chemical pump to operate at a flow rate based on the operating flow rate so that the cleaning compound is supplied to the supply point at a selected chemical dilution ratio; and a display coupled to the controller, with the display displaying the selected chemical dilution ratio and the level of the cleaning solution in the tank.

2. The surface treating apparatus as claimed in claim 1, with the flow control module being a solenoid valve, with the controller calculating a maximum flow rate of the solenoid valve based on the level sensed, and with the controller controlling the solenoid valve to operate at a duty cycle based on the maximum flow rate of the solenoid valve and a selected flow rate of the cleaning solution.

3. The surface treating apparatus as claimed in claim 2, with the duty cycle of the solenoid valve being 100% when the selected flow rate of the cleaning solution is greater than the maximum flow rate of the solenoid valve.

4. The surface treating apparatus as claimed in claim 2, with the solution sensor sensing a static pressure head of the cleaning solution in the tank, and with the controller determining the level of the cleaning solution in the tank using the static pressure head sensed.

5. The surface treating apparatus as claimed in claim 4, with the controller calculating a total amount of the cleaning solution in the tank based on the static pressure head and a geometry of the tank.

6. The surface treating apparatus as claimed in claim 4, further comprising, in combination: a flow rate adjuster coupled to the controller, with the flow rate adjuster being manually operable to adjust the selected flow rate of the cleaning solution, and with the controller controlling the flow control module to operate in response to the flow rate adjuster.

7. The surface treating apparatus as claimed in claim 1, further comprising, in combination: a scrubbing pressure sensor coupled to the controller, with the agitating element agitating the surface with a scrubbing pressure, with the scrubbing pressure sensor sensing a condition indicative of the scrubbing pressure of the agitating element agitating the surface and sending a signal indicative of the scrubbing pressure to the controller; and a scrubbing pressure adjuster coupled to the controller and manually operable to select a magnitude of the scrubbing pressure, with the controller being operable to control the scrubbing pressure of the agitating element agitating the surface indicated by the condition sensed by the scrubbing pressure sensor to be equal to the selected magnitude of the scrubbing pressure.

8. The surface treating apparatus as claimed in claim 1, with the chemical flow line intersecting with the fluid flow line intermediate the flow control module and the tank, and with the chemical mixing with the cleaning solution to form the cleaning compound before entering the flow control module.

9. The surface treating apparatus as claimed in claim 1, with the controller including a memory storing a plurality of chemical dilution ratio settings, with the surface treating apparatus further comprising, in combination: a chemical dilution selection button manually operable to select one of the plurality of chemical dilution ratio settings, and with the display displaying the selected chemical dilution ratio selected from one of the plurality of chemical dilution ratio settings.

10. The surface treating apparatus as claimed in claim 9, with the memory further storing a plurality of flow rate settings, with the flow rate adjuster including a flow rate select button and an indicator representing the plurality of flow rate settings of the cleaning solution to be supplied to the supply point, with the flow rate select button being operable to select one of the plurality of flow rate settings of the cleaning solution, and with the selected flow rate setting indicated by the indicator.

11. The surface treating apparatus as claimed in claim 10, further comprising, in combination: a scrubbing pressure sensor coupled to the controller, with the agitating element agitating the surface with a scrubbing pressure, with the memory further storing a plurality of scrubbing pressure settings, with the scrubbing pressure sensor sensing a condition indicative of the scrubbing pressure of the agitating element agitating the surface and sending a signal indicative of the scrubbing pressure to the controller; and a scrubbing pressure adjuster coupled to the controller and manually operable to select one of the plurality of scrubbing pressure settings, with the controller being operable to control the scrubbing pressure of the agitating element agitating the surface indicated by the condition sensed by the scrubbing pressure sensor to be equal to the scrubbing pressure setting selected from one of the plurality of scrubbing pressure settings.

12. The surface treating apparatus as claimed in claim 11, further comprising, in combination: a motor moving the agitating element to agitate the surface, with the plurality of scrubbing pressure settings including a plurality of amperage settings, with the motor operating at one of the plurality of amperage settings to move the agitating element to agitate the surface, and with the scrubbing pressure sensor sensing the condition of an amperage of the motor moving the agitating element agitating the surface.

13. The surface treating apparatus as claimed in claim 12, further comprising, in combination: a spike button coupled to the controller, with the surface treating apparatus operating at the selected flow rate setting, the selected chemical dilution ratio setting, and the selected scrubbing pressure setting, with the spike button being manually operable to momentarily increase at least one of the selected flow rate setting, the selected chemical dilution ratio setting, and the selected scrubbing pressure setting so that the surface treating apparatus operates at least one of the increased flow rate setting, the increased chemical dilution ratio setting, and the increased scrubbing pressure setting, and with the controller resuming operation of the surface treating apparatus at the selected flow rate setting, the selected chemical dilution ratio setting, and the selected scrubbing pressure setting after the momentary increase.

14. A method for agitating a surface comprising: selecting an operating flow rate of a cleaning solution to be supplied to a supply point; supplying the cleaning solution from a tank through a flow control module through a fluid flow line to a supply point; agitating the cleaning solution with a surface, with agitating the cleaning solution with the surface comprising agitating the surface with a scrubbing pressure; sensing a level of the cleaning solution in the tank; calculating a first flow rate of the flow control module by using the level of the cleaning solution in the tank; and adjusting the first flow rate of the flow control module until the cleaning solution is supplied at the selected operating flow rate; sensing a condition indicative of the scrubbing pressure agitating the surface; selecting a magnitude of the scrubbing pressure; comparing the selected magnitude of the scrubbing pressure with the scrubbing pressure indicated by the condition sensed; and adjusting the scrubbing pressure until the scrubbing pressure indicated by the condition sensed is equal to the selected magnitude of the scrubbing pressure, with sensing the level of the cleaning solution including sensing a static pressure head of the cleaning solution in the tank and determining the level of the cleaning solution in the tank using the static pressure head sensed, with supplying the cleaning solution including supplying the cleaning solution to the fluid flow line through the flow control module in the form of a solenoid valve, with calculating the first flow rate of the flow control module including calculating a maximum flow rate of the solenoid valve based on the static pressure head sensed, and with adjusting the first flow rate including controlling the solenoid valve to operate at a duty cycle based on the maximum flow rate of the solenoid valve and the selected operating flow rate of the cleaning solution.

15. The method as claimed in claim 14, further comprising: supplying a chemical to the fluid flow line, with the cleaning solution mixing with the chemical to form a cleaning compound before supplying the cleaning solution to the supply point; selecting a chemical dilution ratio; calculating a second flow rate of the chemical by using the level of the cleaning solution in the tank; and adjusting the second flow rate until the cleaning compound is supplied at the selected chemical dilution ratio.

16. The method as claimed in claim 14, with agitating the cleaning solution including moving an agitating element with a motor, and with sensing the condition indicative of the scrubbing pressure including sensing an amperage of the motor moving the agitating element.

17. A method for treating a surface comprising: inputting an operating parameter into a controller, with inputting the operating parameter comprising inputting a chemical dilution ratio of a cleaning solution and a chemical in a cleaning compound to be agitated with the surface; operating an agitating element to move relative to the surface under control of the controller according to the operating parameter in a normal condition; inputting a spike condition into the controller, with the controller changing the operating parameter momentarily for a period of time to other than the normal condition, with the controller operating the agitating element according to the changed parameter in the spike condition for the period of time, with the operating parameter returning to the normal condition after the period of time; storing in a memory a plurality of increasing chemical dilution ratio settings, with inputting the chemical dilution ratio comprising selecting one of the plurality of chemical dilution ratio settings and supplying the chemical to the cleaning solution in the normal condition according to the selected one of the plurality of chemical dilution ratio settings, with the agitating element agitating the cleaning compound on the surface, and with changing the operating parameter when the spike condition is inputted comprising changing the selected one of the plurality of chemical dilution ratio settings to another of the plurality of chemical dilution ratio settings of a chemical dilution ratio larger than the selected one of the plurality of chemical dilution ratio settings, with the controller supplying the chemical to the cleaning solution in the spike condition according to the another of the plurality of chemical dilution ratio settings for the period of time.

18. The method as claimed in claim 17, with inputting the operating parameter comprising inputting a flow rate of a cleaning solution to be agitated with the surface by the agitating element.

19. The method as claimed in claim 18, further comprising: storing in a memory a plurality of increasing flow rate settings, with inputting the flow rate comprising selecting one of the plurality of flow rate settings, with the controller providing the cleaning solution in the normal condition according to the selected one of the plurality of flow rate settings, and with changing the operating parameter when the spike condition is inputted comprising changing the selected one of the plurality of flow rate settings to another of the plurality of flow rate settings of a flow rate larger than the selected one of the plurality of flow rate settings, with the controller providing the cleaning solution in the spike condition according to the another of the plurality of flow rate settings for the period of time.

20. The method as claimed in claim 19, with inputting the operating parameter further comprising inputting a scrubbing pressure, with the controller moving the agitating element against the surface with the scrubbing pressure.

21. The method as claimed in claim 20, further comprising: storing in the memory a plurality of increasing scrubbing pressure settings, with inputting the scrubbing pressure comprising selecting one of the scrubbing pressure settings and moving the agitating element against the surface with the selected one of the plurality of scrubbing pressure settings in the normal condition, and with changing the operating parameter when the spike condition is inputted further comprising changing the selected one of the plurality of scrubbing pressure settings to another of the plurality of scrubbing pressure settings of a scrubbing pressure magnitude larger than the selected one of the plurality of scrubbing pressure settings, with the controller moving the agitating element against the surface in the spike condition according to the another of the plurality of scrubbing pressure settings for the period of time.

22. The method as claimed in claim 17, with inputting the operating parameter further comprising inputting a scrubbing pressure, with the controller moving the agitating element against the surface with the scrubbing pressure.

23. The method as claimed in claim 22, further comprising: storing in the memory a plurality of increasing scrubbing pressure settings, with inputting the scrubbing pressure comprising selecting one of the scrubbing pressure settings and moving the agitating element against the surface with the selected one of the plurality of scrubbing pressure settings in the normal condition, and with changing the operating parameter when the spike condition is inputted comprising changing the selected one of the plurality of scrubbing pressure settings to another of the plurality of scrubbing pressure settings of a scrubbing pressure magnitude larger than the selected one of the plurality of scrubbing pressure settings, with the controller moving the agitating element against the surface in the spike condition according to the another of the plurality of scrubbing pressure settings for the period of time.

24. A method for treating a surface comprising: inputting an operating parameter into a controller, with inputting the operating parameter comprising inputting a scrubbing pressure; operating an agitating element to move relative to the surface under control of the controller according to the operating parameter in a normal condition, with the controller moving the agitating element against the surface with the scrubbing pressure; inputting a spike condition into the controller, with the controller changing the operating parameter momentarily for a period of time to other than the normal condition, with the controller operating the agitating element according to the changed parameter in the spike condition for the period of time, with the operating parameter returning to the normal condition after the period of time; storing in a memory a plurality of increasing scrubbing pressure settings, with inputting the scrubbing pressure comprising selecting one of the scrubbing pressure settings and moving the agitating element against the surface with the selected one of the plurality of scrubbing pressure settings in the normal condition, and with changing the operating parameter when the spike condition is inputted comprising changing the selected one of the plurality of scrubbing pressure settings to another of the plurality of scrubbing pressure settings of a scrubbing pressure magnitude larger than the selected one of the plurality of scrubbing pressure settings, with the controller moving the agitating element against the surface in the spike condition according to the another of the plurality of scrubbing pressure settings for the period of time.

25. The method as claimed in claim 24, with inputting the operating parameter comprising inputting a flow rate of a cleaning solution to be agitated with the surface by the agitating element.

26. The method as claimed in claim 25, further comprising: storing in a memory a plurality of increasing flow rate settings, with inputting the flow rate comprising selecting one of the plurality of flow rate settings, with the controller providing the cleaning solution in the normal condition according to the selected one of the plurality of flow rate settings, and with changing the operating parameter when the spike condition is inputted comprising changing the selected one of the plurality of flow rate settings to another of the plurality of flow rate settings of a flow rate larger than the selected one of the plurality of flow rate settings, with the controller providing the cleaning solution in the spike condition according to the another of the plurality of flow rate settings for the period of time.

27. A surface treating apparatus comprising, in combination: an agitating element moving relative to a surface; a controller controlling the agitating element to move relative to the surface; a first adjuster operatively connected to the controller and selecting an operating parameter of the agitating element under control of the controller; a spike button operatively connected to the controller, with the controller momentarily changing the operating parameter of the agitating element for a period of time when the spike button is operated, with the controller resuming the operating parameter of the agitating element after the period of time, with the first adjuster selecting a flow rate of a cleaning solution to be supplied to the surface, with the agitating element agitating the cleaning solution on the surface, with the controller including a memory storing a plurality of flow rate settings, with the first adjuster selecting the operating parameter from one of the plurality of flow rate settings, with the controller providing the cleaning solution to the surface according to the selected one of the plurality of flow rate settings, with the controller changing the selected one of the plurality of flow rate settings to another of the plurality of flow rate settings of a flow rate larger than the selected one of the plurality of flow rate settings for a period of time when the spike button is operated, with the controller providing the cleaning solution to the surface according to the another of the plurality of flow rate settings for the period of time when the spike button is operated, and with the controller providing the cleaning solution to the surface according to the selected one of the plurality of flow rate settings after the period of time; a second adjuster operatively connected to the controller, with the second adjuster selecting a chemical dilution ratio of the cleaning solution and a chemical of a cleaning compound under control of the controller, with the agitating element agitating the cleaning compound on the surface, with the controller including a memory storing a plurality of chemical dilution ratio settings, with the second adjuster selecting one of the plurality of chemical dilution ratio settings, with the controller supplying the cleaning compound to the cleaning solution according to the selected one of the plurality of chemical dilution ratio settings, with the controller changing the selected one of the plurality of chemical dilution ratio settings to another of the plurality of chemical dilution ratio settings of a chemical dilution ratio larger than the selected one of the plurality of chemical dilution ratio settings for a period of time when the spike button is operated, with the controller supplying the cleaning compound to the surface according to the another of the plurality of chemical dilution ratio settings for the period of time when the spike button is operated, and with the controller supplying the cleaning compound to the surface according to the selected one of the plurality of chemical dilution ratio settings after the period of time.

28. The surface treating apparatus as claimed in claim 27, further comprising, in combination: a third adjuster operatively connected to the controller, with the third adjuster selecting a scrubbing pressure of the agitating element agitating the surface under control of the controller, with the controller including a memory storing a plurality of scrubbing pressure settings, with the third adjuster selecting one of the plurality of scrubbing pressure settings, with the controller controlling the agitating element to agitate the surface according to the selected one of the plurality of scrubbing pressure settings, with the controller changing the selected one of the plurality of scrubbing pressure settings to another of the plurality of scrubbing pressure settings of a scrubbing pressure magnitude larger than the selected one of the plurality of scrubbing pressure settings for a period of time when the spike button is operated, with the controller controlling the agitating element to agitate the surface according to the another of the plurality of scrubbing pressure settings for the period of time when the spike button is operated, and with the controller controlling the agitating element to agitate the surface according to the selected one of the plurality of scrubbing pressure settings after the period of time.

29. A surface treating apparatus comprising, in combination: an agitating element moving relative to a surface; a controller controlling the agitating element to move relative to the surface; a first adjuster operatively connected to the controller and selecting an operating parameter of the agitating element under control of the controller; a spike button operatively connected to the controller, with the controller momentarily changing the operating parameter of the agitating element for a period of time when the spike button is operated, with the controller resuming the operating parameter of the agitating element after the period of time, with the first adjuster selecting a flow rate of a cleaning solution to be supplied to the surface, with the agitating element agitating the cleaning solution on the surface, with the controller including a memory storing a plurality of flow rate settings, with the first adjuster selecting the operating parameter from one of the plurality of flow rate settings, with the controller providing the cleaning solution to the surface according to the selected one of the plurality of flow rate settings, with the controller changing the selected one of the plurality of flow rate settings to another of the plurality of flow rate settings of a flow rate larger than the selected one of the plurality of flow rate settings for a period of time when the spike button is operated, with the controller providing the cleaning solution to the surface according to the another of the plurality of flow rate settings for the period of time when the spike button is operated, and with the controller providing the cleaning solution to the surface according to the selected one of the plurality of flow rate settings after the period of time; a second adjuster operatively connected to the controller, with the second adjuster selecting a scrubbing pressure of the agitating element agitating the surface under control of the controller, with the controller including a memory storing a plurality of scrubbing pressure settings, with the second adjuster selecting one of the plurality of scrubbing pressure settings, with the controller controlling the agitating element to agitate the surface according to the selected one of the plurality of scrubbing pressure settings, with the controller changing the selected one of the plurality of scrubbing pressure settings to another of the plurality of scrubbing pressure settings of a scrubbing pressure magnitude larger than the selected one of the plurality of scrubbing pressure settings for a period of time when the spike button is operated, with the controller controlling the agitating element to agitate the surface according to the another of the plurality of scrubbing pressure settings for the period of time when the spike button is operated, and with the controller controlling the agitating element to agitate the surface according to the selected one of the plurality of scrubbing pressure settings after the period of time.

30. A surface treating apparatus comprising, in combination: an agitating element moving relative to a surface; a controller controlling the agitating element to move relative to the surface; a first adjuster operatively connected to the controller and selecting an operating parameter of the agitating element under control of the controller; and a spike button operatively connected to the controller, with the controller momentarily changing the operating parameter of the agitating element for a period of time when the spike button is operated, with the controller resuming the operating parameter of the agitating element after the period of time, with the first adjuster selecting a chemical dilution ratio of a cleaning solution and a chemical of a cleaning compound to be supplied to the surface, with the agitating element agitating the cleaning compound on the surface, with the controller including a memory storing a plurality of chemical dilution ratio settings, with the first adjuster selecting the operating parameter from one of the plurality of chemical dilution ratio settings, with the controller supplying the cleaning compound to the cleaning solution according to the selected one of the plurality of chemical dilution ratio settings, with the controller changing the selected one of the plurality of chemical dilution ratio settings to another of the plurality of chemical dilution ratio settings of a chemical dilution ratio larger than the selected one of the plurality of chemical dilution ratio settings for a period of time when the spike button is operated, with the controller supplying the cleaning compound to the surface according to the another of the plurality of chemical dilution ratio settings for the period of time when the spike button is operated, and with the controller supplying the cleaning compound to the surface according to the selected one of the plurality of chemical dilution ratio settings after the period of time.

31. The surface treating apparatus as claimed in claim 30, further comprising, in combination: a second adjuster operatively connected to the controller, with the second adjuster selecting a scrubbing pressure of the agitating element agitating the surface under control of the controller, with the controller including a memory storing a plurality of scrubbing pressure settings, with the second adjuster selecting one of the plurality of scrubbing pressure settings, with the controller controlling the agitating element to agitate the surface according to the selected one of the plurality of scrubbing pressure settings, with the controller changing the selected one of the plurality of scrubbing pressure settings to another of the plurality of scrubbing pressure settings of a scrubbing pressure magnitude larger than the selected one of the plurality of scrubbing pressure settings for a period of time when the spike button is operated, with the controller controlling the agitating element to agitate the surface according to the another of the plurality of scrubbing pressure settings for the period of time when the spike button is operated, and with the controller controlling the agitating element to agitate the surface according to the selected one of the plurality of scrubbing pressure settings after the period of time.

32. A surface treating apparatus comprising, in combination: an agitating element moving relative to a surface; a controller controlling the agitating element to move relative to the surface; a first adjuster operatively connected to the controller and selecting an operating parameter of the agitating element under control of the controller; and a spike button operatively connected to the controller, with the controller momentarily changing the operating parameter of the agitating element for a period of time when the spike button is operated, with the controller resuming the operating parameter of the agitating element after the period of time, with the first adjuster selecting a scrubbing pressure of the agitating element agitating the surface, with the controller including a memory storing a plurality of scrubbing pressure settings, with the first adjuster selecting the operating parameter from one of the plurality of scrubbing pressure settings, with the controller controlling the agitating element to agitate the surface according to the selected one of the plurality of scrubbing pressure settings, with the controller changing the selected one of the plurality of scrubbing pressure settings to another of the plurality of scrubbing pressure settings of a scrubbing pressure magnitude larger than the selected one of the plurality of scrubbing pressure settings for a period of time when the spike button is operated, with the controller controlling the agitating element to agitate the surface according to the another of the plurality of scrubbing pressure settings for the period of time when the spike button is operated, and with the controller controlling the agitating element to agitate the surface according to the selected one of the plurality of scrubbing pressure settings after the period of time.

33. The surface treating apparatus as claimed in claim 32, with the first adjuster selecting a flow rate of a cleaning solution to be supplied to the surface, with the agitating element agitating the cleaning solution on the surface, with the controller including a memory storing a plurality of flow rate settings, with the first adjuster selecting the operating parameter from one of the plurality of flow rate settings, with the controller providing the cleaning solution to the surface according to the selected one of the plurality of flow rate settings, with the controller changing the selected one of the plurality of flow rate settings to another of the plurality of flow rate settings of a flow rate larger than the selected one of the plurality of flow rate settings for a period of time when the spike button is operated, with the controller providing the cleaning solution to the surface according to the another of the plurality of flow rate settings for the period of time when the spike button is operated, and with the controller providing the cleaning solution to the surface according to the selected one of the plurality of flow rate settings after the period of time.

\* \* \* \* \*